UNITED STATES PATENT OFFICE.

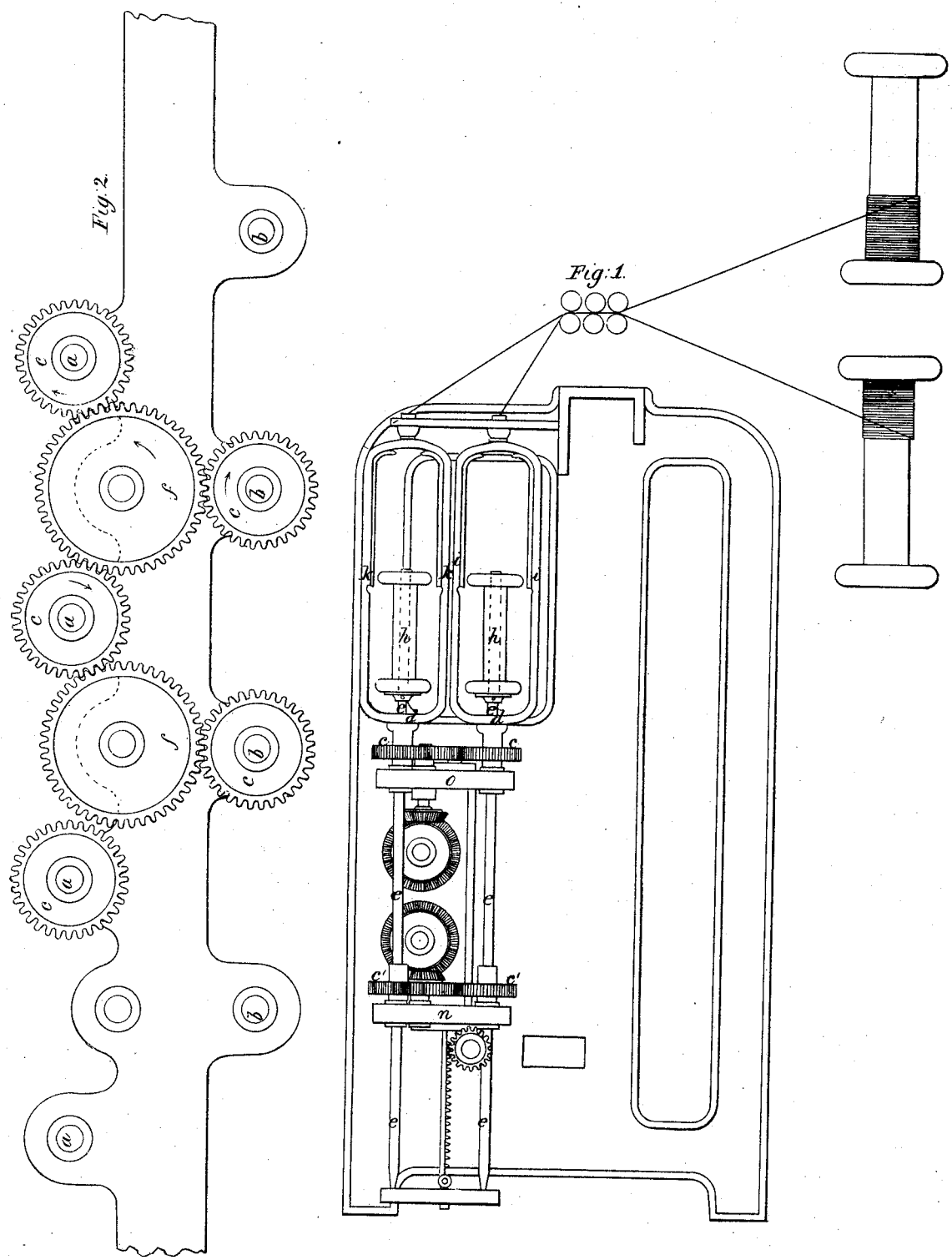

WM. C. DAVOLL, OF FALL RIVER, MASSACHUSETTS.

SPEEDER, DOUBLE SPEEDER, OR FLY-FRAME USED IN ROVING COTTON, &c.

Specification of Letters Patent No. 3,089, dated May 19, 1843.

*To all whom it may concern:*

Be it known that I, WILLIAM C. DAVOLL, of Fall River, in the county of Bristol and State of Massachusetts, have invented certain new and useful improvements in the machine, known by the name of "speeder, double speeder, or fly frame," used for roving cotton preparatory to spinning; and I do hereby declare that the following is a full and exact description thereof.

My main improvement consists in the manner in which I arrange the spindles in two rows, by means of which arrangement only about one half the room is required to receive the same number of spindles; the operator can also attend to a greater number than usual; much less power will be required to put them in motion; the cost per spindle will, also, be much less, the double row requiring but little more gearing than a single row; and the machine will bear running at a much higher velocity than the English fly frame.

In the accompanying drawing Figure 1, represents an end view of the machine, and Fig. 2, a top view of a spindle, or flier rail. The position these rails occupy in the machine is shown at $n$, and $o$, Fig. 1; $n$, being an end view of the spindle, and $o$, of the flier rail, with the requisite gearing upon them, which is the same on each of them. These rails, instead of being drilled, like those in common use, with a single row of holes for supporting the spindles which pass through them, are drilled with a double row, as shown at $a$, $a$, and $b$, $b$, Fig. 2. The back row $b$, $b$, is placed about five inches from the front row, $a$, $a$, or about the width of the flier to be used.

The holes $b$, $b$, of the back row are drilled intermediate between those of the front row $a$, $a$, and by this arrangement, the bobbins $h$, are readily changed.

The spindles $e$, $e$, $e$, Fig. 1, work up and down through the rows of holes $a$, $a$, and $b$, $b$, and through the tubed wheels $c$, $c$, Figs. 1, and 2; and also through the bottoms of the fliers, as seen at $d$. The respective revolving and vertical motions of the spindles and fliers are effected in any of the known modes. The fliers, as shown in the back row at $i$, Fig. 1, are made to stand with their planes at right angles to those of the front row $k$; this, with their intermediate position, greatly facilitating the changing of the bobbins.

To the bottom of each flier a tube wheel is attached, as seen at $c$, Figs. 1, and 2; and a similar wheel is attached to each spindle, as shown at $c'$, $c'$, Fig. 1, and motion is consequently communicated to them independently; but the respective fliers and spindles of both rows are geared into the same intermediate wheels $f$, $f$, as shown in Fig. 2. The above constitutes the whole gearing for giving motion to the back row of fliers and spindles. It will be seen that the flier as used by me, and shown at $i$, $i$, and $k$, $k$, is made in one continuous piece, instead of being open at the bottom, as is the case with those generally used in the English fly frame; and this, among other reasons, enables me to give the increased velocity above referred to.

Having thus, fully described the nature of my invention in the improved construction of the speeder, double speeder, or fly-frame, what I claim therein as new, and desire to secure by Letters Patent, is—

The arrangement of the spindles and fliers in two rows, in combination with the described arrangement of gearing. And this I claim whether the said gearing be arranged precisely as herein represented, or in any other manner which is substantially the same, producing a like result upon the same principle.

WILLIAM C. DAVOLL.

Witnesses:
B. K. MORSELE,
EDWIN L. BRUNDAGE.